(12) United States Patent
Ha et al.

(10) Patent No.: US 9,867,162 B2
(45) Date of Patent: Jan. 9, 2018

(54) DEVICE AND METHOD FOR PROVIDING NOTIFICATION ON WIRELESS CHARGING STATE

(71) Applicant: Samsung Electronics Co., Ltd., Gyeonggi-do (KR)

(72) Inventors: Jae Mu Ha, Gyeonggi-do (KR); Ki Jong Byun, Gyeonggi-do (KR); Young Mi Ha, Gyeonggi-do (KR); Jae Ho Song, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/185,421

(22) Filed: Jun. 17, 2016

(65) Prior Publication Data

US 2016/0374049 A1    Dec. 22, 2016

(30) Foreign Application Priority Data

Jun. 19, 2015  (KR) .......................... 10-2015-0087231

(51) Int. Cl.
*H04B 1/38*    (2015.01)
*H02J 7/00*    (2006.01)
(Continued)

(52) U.S. Cl.
CPC ........... *H04W 68/005* (2013.01); *H02J 7/025* (2013.01); *H02J 50/10* (2016.02); *H04B 5/0037* (2013.01); *H04B 5/0093* (2013.01); *H04L 43/16* (2013.01); *H04M 1/72569* (2013.01); *H04M 1/72583* (2013.01); *H04W 52/0254* (2013.01);
(Continued)

(58) Field of Classification Search
CPC ...... H04B 5/00; H04B 5/0025; H04B 5/0037; H04B 1/38; H04B 1/3883; H02J 7/00; H02J 7/0003; H02J 7/0047; H02J 7/0021
See application file for complete search history.

(56) References Cited

U.S. PATENT DOCUMENTS 8,120,316 B2    2/2012    Sip
9,203,252 B2    12/2015   Robison
(Continued)

FOREIGN PATENT DOCUMENTS

JP    2012016169    1/2012
JP    2014011893    1/2014
(Continued)

OTHER PUBLICATIONS

International Search Report dated Oct. 6, 2016 issued in counterpart application No. PCT/KR2016/006443, 11 pages.
(Continued)

*Primary Examiner* — Blane Jackson
(74) *Attorney, Agent, or Firm* — The Farrell Law Firm, P.C.

(57) ABSTRACT

An electronic device and a method of providing a notification on a wireless charging state in an electronic device are provided. The method includes wirelessly charging the electronic device by using power received from an external device; checking a state of the wireless charging; when the state of the wireless charging corresponds to a certain condition, determining whether the electronic device is used by a user by using at least one sensor; and providing a notification based on whether the electronic device is used by the user.

20 Claims, 15 Drawing Sheets

(51) Int. Cl.

| | | |
|---|---|---|
| *H04W 68/00* | (2009.01) | |
| *H02J 7/02* | (2016.01) | |
| *H04B 5/00* | (2006.01) | |
| *H02J 50/10* | (2016.01) | |
| *H04L 12/26* | (2006.01) | |
| *H04M 1/725* | (2006.01) | |
| *H04W 52/02* | (2009.01) | |
| *H02J 50/90* | (2016.01) | |
| *H04W 88/02* | (2009.01) | |
| *H04M 1/04* | (2006.01) | |

(52) U.S. Cl.
CPC ............. *H02J 7/0047* (2013.01); *H02J 50/90* (2016.02); *H04M 1/04* (2013.01); *H04W 88/02* (2013.01)

(56) References Cited

U.S. PATENT DOCUMENTS

| | | | |
|---|---|---|---|
| 2008/0207277 A1 | 8/2008 | Sunda | |
| 2010/0259214 A1 | 10/2010 | Sip | |
| 2012/0001591 A1* | 1/2012 | Fukaya | H02J 7/025 320/108 |
| 2012/0052923 A1* | 3/2012 | Park | H02J 7/025 455/567 |
| 2013/0117552 A1* | 5/2013 | Kim | H04M 19/047 713/100 |
| 2013/0162430 A1 | 6/2013 | Scherzer et al. | |
| 2014/0203770 A1 | 7/2014 | Salter et al. | |
| 2014/0266005 A1 | 9/2014 | Havass et al. | |
| 2014/0312836 A1 | 10/2014 | Lundgren et al. | |
| 2014/0364173 A1* | 12/2014 | Tuli | H04B 1/3883 455/573 |
| 2015/0054455 A1* | 2/2015 | Kim | H02J 17/00 320/108 |
| 2015/0056920 A1* | 2/2015 | Huttunen | H04B 7/26 455/41.2 |
| 2015/0084584 A1 | 3/2015 | Monks et al. | |
| 2015/0130623 A1 | 5/2015 | Robison | |
| 2015/0236539 A1* | 8/2015 | Park | H04B 1/3883 455/573 |
| 2016/0056664 A1* | 2/2016 | Partovi | H02J 7/025 307/104 |
| 2016/0204642 A1 | 7/2016 | Oh et al. | |
| 2016/0261026 A1* | 9/2016 | Han | H01Q 1/243 |
| 2016/0261135 A1 | 9/2016 | Iwabuchi | |

FOREIGN PATENT DOCUMENTS

| | | |
|---|---|---|
| WO | WO 2015/023092 | 2/2015 |
| WO | WO 2015/059912 | 4/2015 |

OTHER PUBLICATIONS

European Search Report dated Nov. 25, 2016 issued in counterpart application No. 16175069.0-1804, 9 pages.

* cited by examiner

DEVICE AND METHOD FOR PROVIDING NOTIFICATION ON WIRELESS CHARGING STATE

PRIORITY

This application claims priority under 35 U.S.C. §119(a) to a Korean Patent Application filed on Jun. 19, 2015 in the Korean Intellectual Property Office and assigned Serial number 10-2015-0087231, the entire disclosure of which is incorporated herein by reference.

BACKGROUND

1. Field of the Disclosure

The present disclosure relates generally to an electronic device and method for providing a notification on a wireless charging state of an electronic device, and more particularly, to an electronic device a method of determining whether the electronic device is used by a user by using at least one sensor and providing a notification based on whether the electronic device is used by the user.

2. Description of the Related Art

Recently, an electronic device such as a smartphone has begun to be used to support wireless charging. For example, when a user puts a smartphone on a wireless charging pad, a battery of the smartphone may be charged by electromagnetic induction between a transmission coil inside the wireless charging pad and a reception coil inside the smartphone.

Wireless charging may be classified into a method using magnetic resonance and a method using magnetic induction. In the case of a wireless charging method using magnetic induction, when the position of a transmission coil and the position of a reception coil are in close proximity to each other, charging is possible, and when the position of a transmission coil and the position of a reception coil are far away from each other or not matched, charging efficiency may drop or charging may stop.

Wireless charging may not be performed normally due to a positioning of an electronic device relative to a wireless charging pad. In general, it is difficult for a user to identify the position of a coil for wireless charging inside an electronic device. Additionally, it is difficult to identify the position of a transmission coil in a charging pad. A user might assume that a coil is disposed at the center of an electronic device or a charging pad, or that wireless charging is performed efficiently by matching the central axes of an electronic device and a charging pad to some degree. A user might put an electronic device on a wireless charging pad without being aware of wireless charging principles. However, in such cases, although it is possible that wireless charging efficiency drops or a battery is not charged at all, an electronic device does not provide a proper notification of these occurrences. As a result, a user may think that an electronic device is being charged at a sufficient rate, but upon checking the electronic device, the user may learn that the battery has not been substantially charged.

In other cases, a user may put an electronic device on a wireless charging pad and adjust its position in order to charge the electronic device. Alternatively, while putting an electronic device on a wireless charging pad, a user may perform a task such as executing an application or surfing the web regardless of charging. When an electronic device is used by a user in such a way, providing a notification that wireless charging is not being performed normally may cause a user to pause or stop a task being performed by the user.

SUMMARY

Accordingly, an aspect of the present disclosure is to provide a device and method for providing a notification according to a usage state of an electronic device in a situation where wireless charging is being performed abnormally in the electronic device.

In accordance with an aspect of the present disclosure, an electronic device for supporting wireless charging is provided. The electronic device includes at least one sensor configured to detect whether the electronic device is used by a user; a wireless charging module configured to charge the electronic device by using power obtained from an external device; and a processor functionally connected to the at least one sensor and the wireless charging module, wherein the processor is configured to check charging state information of the wireless charging module, determine whether the electronic device is used by the user by using the at least one sensor when the charging state information corresponds to a certain condition, and provide a notification based on whether the electronic device is used by the user.

In accordance with another aspect of the present disclosure, a method of providing a notification on a wireless charging state in an electronic device is provided. The method includes wirelessly charging the electronic device by using power received from an external device; checking a state of the wireless charging; when the state of the wireless charging corresponds to a certain condition, determining whether the electronic device is used by a user by using at least one sensor; and providing a notification based on whether the electronic device is used by the user.

In accordance with another aspect of the present disclosure, a non-transitory computer-readable storage medium for storing a computer readable instruction is provided. The non-transitory computer-readable storage medium, wherein the instruction, when executed by a processor of an electronic device, allows the electronic device to perform wirelessly charging the electronic device by using power received from an external device; checking a state of the wireless charging; when the state of the wireless charging corresponds to a certain condition, determining whether the electronic device is used by a user by using at least one sensor; and providing a notification based on whether the electronic device is used by the user.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF EMBODIMENTS OF THE PRESENT DISCLOSURE

Figure 1:
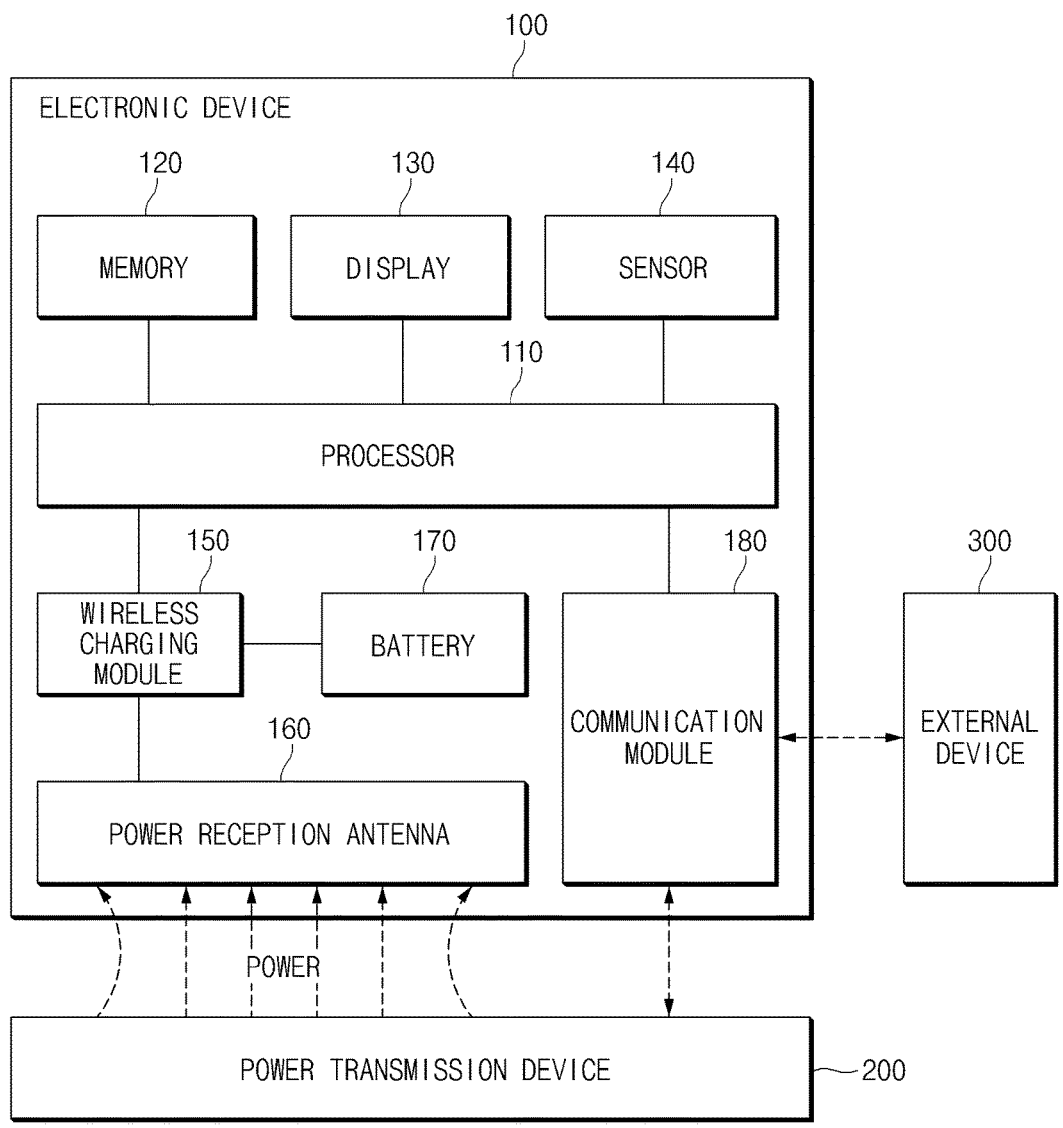
FIG. 1 is a block diagram of an electronic device in a network environment according to an embodiment of the present disclosure.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms "include," "comprise," "have," "may include," "may comprise," and "may have" used herein indicate disclosed functions, operations, or the existence of elements but do not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

Hereinafter, an electronic device according to various embodiments of the present disclosure will be described in more detail with reference to the accompanying drawings. The term "user" in the present disclosure may refer to a person using an electronic device or a device using an electronic device (for example, an electronic device that performs artificial intelligence).

FIG. 1 is a block diagram of an electronic device in a network environment according to an embodiment of the present disclosure.

Referring to FIG. 1, an electronic device 100 may include a processor 110, a memory 120, a display 130, a sensor 140, a wireless charging module 150, a power reception antenna 160, a battery 170, and a communication module 180. The electronic device 100 may omit at least one of the components or may additionally include a different component.

The processor 110 may include at least one of a CPU, an AP, and a communication processor (CP). The processor 110, for example, may execute a calculation or process data for control and/or communication of at least one other component of the electronic device 100.

The memory 120 may include volatile and/or nonvolatile memory. The memory 120, for example, may store instructions or data relating to at least one component of the electronic device 100. According to an embodiment of the present disclosure, the memory 120 may store software and/or programs. The programs may include a kernel, middleware, an application programming interface (API), and/or an application program (or an application). At least part of the kernel, the middleware, and the API may be called an operating system (OS).

A kernel, for example, may control or manage system resources used for executing an operation or a function implemented in other programs. Additionally, a kernel may provide an interface for controlling or managing system resources by accessing an individual component of the electronic device 100 from a middleware, an API, or an application program.

Middleware, for example, may serve an intermediary role for exchanging data as an API or an application program communicates with a kernel.

Additionally, middleware may process at least one job request received from an application program according to priority. For example, middleware may assign a priority for using a system resource of the electronic device 100 to at least one application program. For example, middleware may perform scheduling or load balancing on at least one job request by processing the at least one job request according to the priority assigned to the at least one job request.

An API, as an interface for allowing an application program to control a function provided from a kernel or middleware, may include at least one interface or function (for example, an instruction) for file control, window control, image processing, or character control.

The display 130, for example, may include a liquid crystal display (LCD), a light emitting diode (LED) display, an organic light emitting diode (OLED) display, a microelectromechanical systems (MEMS) display, or an electronic paper display. The display 130 may display various contents (for example, text, image, video, icon, symbol, and so on) to a user. The display 130 may include a touch screen, and, for example, may receive a touch, a gesture, a proximity input, or a hovering input by using an electronic pen or a part of a user's body.

The sensor 140 includes all components for detecting a user input or a movement of an electronic device and a surrounding situation of an electronic device regardless of the name of a component. For example, the sensor 140 may be understood as a camera for capturing an image in the vicinity of the electronic device 100 or a touch screen panel for recognizing a user's touch input, in addition to a module that is generally recognized as a sensor such as an acceleration sensor, a temperature/humidity sensor, and a fingerprint sensor. Examples of various types of sensors or hardware modules corresponding to the sensor 140 are described below with reference to FIG. 11.

The wireless charging module 150 may include a rectifier circuit for charging the battery 170 and a matching circuit for generating electromagnetic induction in the power reception antenna 160. For example, the wireless charging module 150 may convert alternating current (AC) obtained by the power reception antenna 160 into direct current (DC), and may provide a DC current to the battery 170. Additionally, the wireless charging module 150 may monitor voltage or current provided to the battery 170 and provide information on the voltage or the current to the processor 110 or another type of processor (for example, a sensor hub or a CP).

The power reception antenna 160 may correspond to a reception coil for charging. For example, the power reception antenna 160 may be formed at a structure such as a rear surface cover or battery of the electronic device 100 and may be connected to the wireless charging module 150. When a magnetic field is formed by a current flowing in a transmission coil included in an external device for wireless charging, for example, a power transmission device 200, current may be generated in the power reception antenna 160 through electromagnetic induction.

The communication module 180 may establish a communication connection between the electronic device 100 and the power transmission device 200 or an external device 300. For example, the communication module 180 may communicate with the external device 300 through wireless communication or wired communication. Additionally, the communication module 180 may communicate with the power transmission device 200 (for example, a wireless charging pad) through wireless communication. For example, when a current supplied to the battery 170 through the wireless charging module 150 is less than a reference value, the communication module 180 may transmit a message for increasing a transmission output to the power transmission device 200 according to a control of the processor 110.

Herein, the wireless communication, as a cellular communication protocol, may use at least one of long-term evolution (LTE), LTE Advance (LTE-A), code division multiple access (CDMA), wideband CDMA (WCDMA), universal mobile telecommunications system (UMTS), wireless broadband (WiBro), global system for mobile communications (GSM), and so on. Additionally, the wireless communication may include short-range communication. The short-range communication, for example, may include at least one of wireless fidelity (Wi-Fi), Bluetooth, and near field communication (NFC).

Additionally, the electronic device 100, for example, may include an input/output interface. The input/output interface, for example, may serve as an interface for delivering instructions or data inputted from a user or another external device to another component(s) of the electronic device 100. Additionally, the input/output interface may output instructions or data received from another component(s) of the electronic device 100 to a user or another external device.

The external device 300 may be the same as or different from the type of the electronic device 100. According to various embodiments of the present disclosure, all or part of operations executed on the electronic device 100 may be executed on another one or more electronic devices (for example, the external device 300). According to an embodiment of the present disclosure, when the electronic device 100 performs a certain function or service automatically or by a request, it may request at least part of a function relating thereto from the external device 300 instead of, or in addition to, executing the function or service by itself. The other electronic device (for example, the external device 300) may execute a requested function or an additional function and may deliver an execution result to the electronic device 100. The electronic device 100 may provide the requested function or service by using the received result as is or by further processing the received result.

An electronic device for supporting wireless charging according to an embodiment of the present disclosure may include at least one sensor configured to detect whether the electronic device is used by a user; a wireless charging module configured to charge the electronic device by using a power obtained from an external device; and a processor functionally connected to at least one of the sensor and the wireless charging module. Herein, the processor may perform checking charging state information of the wireless charging module, determining whether the electronic device is used by a user by using the at least one sensor when the charging state information corresponds to a certain condition, and providing a notification based on whether the electronic device is used.

Additionally, when a charging voltage is less than a first reference voltage or greater than a second reference voltage, or when a charging current is less than a first reference current or greater than a second reference current, the processor may determine that the charging state information corresponds to the certain condition.

Additionally, when the charging of the electronic device is released more than a certain number of times for certain time duration, the processor may determine that the charging state information corresponds to the certain condition.

Additionally, the electronic device may include a motor configured to generate a vibration effect, and the processor may provide at least one of the vibration effect and sound as the notification.

Moreover, the electronic device may further include a display, and the processor may display a notification message on the display.

Furthermore, the electronic device may further include a display including a flat area and a curved area extending from one side of the flat area, and the processor may output a color concerning the charging state to the curved area.

Additionally, the processor may reset a reference value for providing the notification by analyzing the charging state information.

Moreover, the processor may determine whether the electronic device satisfies at least one condition that limits the notification and when the at least one condition is satisfied based on the determination result, limit the notification. Herein, the at least one condition that limits the notification may correspond to at least one of whether the current time corresponds to a certain time duration, whether the remaining amount of battery power of a battery functionally connected to the electronic device is greater than a certain level, location information of the electronic device, and schedule information of the user.

Additionally, the at least one sensor may include at least one of an acceleration sensor, a gyroscope sensor, and a gesture sensor; and the processor may provide the notification when there is no movement detected by the at least one sensor.

Moreover, the at least one sensor may include at least one of a proximity sensor, a fingerprint recognition sensor, and a heart rate sensor; and the processor may provide the notification when data recognition through the at least one sensor does not occur.

Furthermore, the sensor may include a touch screen panel; and the processor may provide the notification when a touch input through the touch screen panel is not detected.

Additionally, the sensor may include a camera module; and the processor may provide the notification based on a frame change of an image obtained by the camera module.

Moreover, the electronic device may further include a communication module configured to establish a connection between the electronic device and an external device; and the processor may transmit a notification request message for allowing the external device to provide the notification to the external device.

Furthermore, when a feedback on the notification provided from the electronic device does not occur for a certain time, the processor may transmit the notification request message to the external device.

Figure 2:
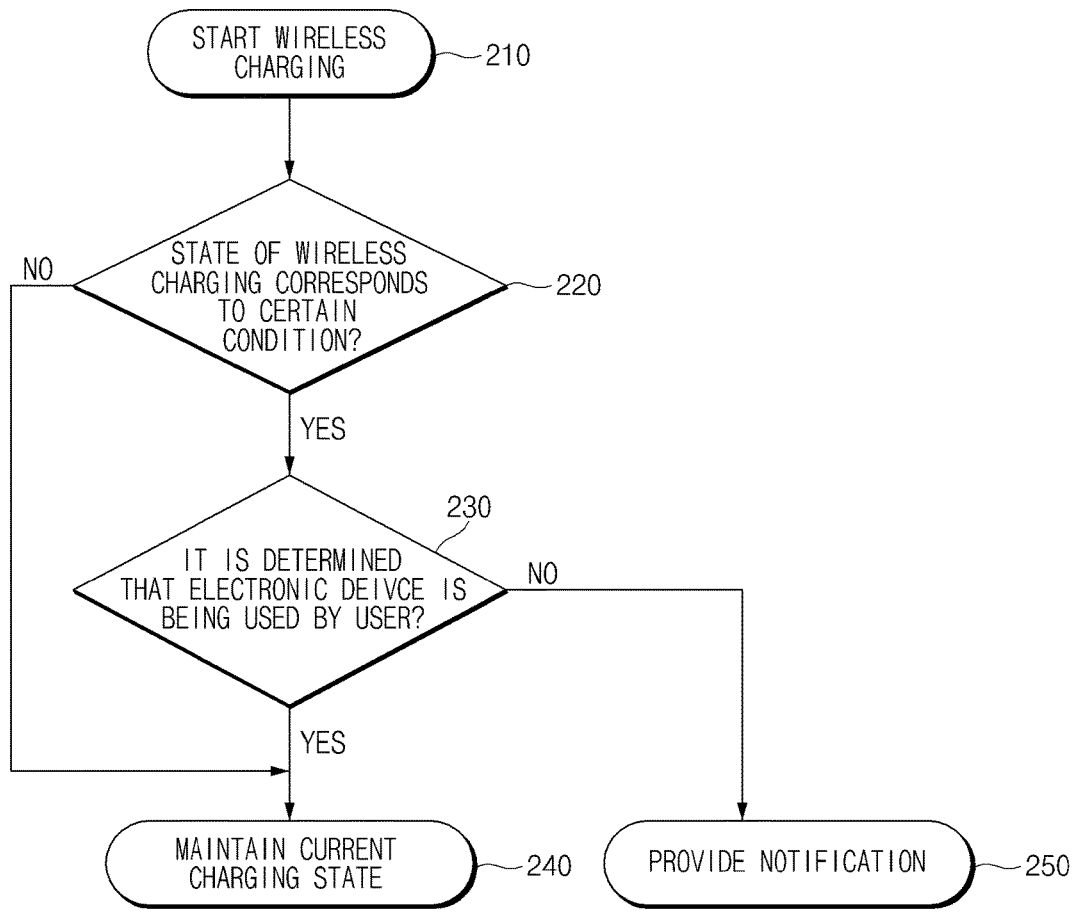
FIG. 2 is a flowchart of a method of notifying of a wireless charging state according to an embodiment of the present disclosure.

FIG. 2 is a flowchart of a method of notifying of a wireless charging state according to an embodiment of the present disclosure.

Referring to FIG. 2, in operation 210, an electronic device (for example, the electronic device 100 of FIG. 1) may start wireless charging. For example, when the electronic device 100 recognizes that it is put on the power transmission device 200 (for example, a charging pad), it may start wireless charging automatically. In more detail, when the electronic device 100 is disposed within a predetermined distance from the power transmission device 200, a communication connection is established between the power transmission device 200 and the electronic device 100 (for example, the communication module 180), and according to a control message (for example, charging start) transmitted from the electronic device 100, the power transmission device 200 may supply current to the transmission coil inside the power transmission device 200. In another example, when detecting the weight of the electronic device 100 or the approach of the electronic device 100, the power transmission device 200 may supply current to the transmission coil automatically. Once current is supplied to the transmission coil, current may flow in the reception coil (for example, the power reception antenna 160) of the electronic device 100 by electromagnetic induction, and charging of the battery 170 may start.

In operation 220, the electronic device 100, for example, may determine whether an abnormal phenomenon occurs during wireless charging. This operation may be performed by the wireless charging module 150 or may be performed by the processor 110 based on information provided by the wireless charging module 150. The electronic device 100 may check a wireless charging state and if the checked wireless charging state satisfies a certain condition, determine that an abnormal phenomenon occurs during wireless charging.

Since the electronic device 100 is not in a fixed state but in a state of being put on the power transmission device 200, wireless charging may be stopped or its efficiency may be dropped due to various reasons (for example, a user touches the electronic device 100 inadvertently or the electronic device 100 is moved by a wired earphone/headset connected to the electronic device 100). In some cases, the efficiency of wireless charging may be increased significantly. For example, when the electronic device 100 is disposed in a twisted orientation with respect to the power transmission device 200, the electronic device 100 may send a message for increasing an output to the power transmission device 200 in order to satisfy a target current value. When the electronic device 100 and the power transmission device 200 are disposed to match each other in a state that an output power of the power transmission device 200 is high, the level of current or voltage supplied to the battery 170 may be increased significantly more than a reference value.

Whether an abnormal situation occurs during wireless charging may be determined based on the following criteria. For example, when a charging voltage (for example, VBUS) supplied to the battery 170 is less than a first reference voltage (for example, under voltage lockout (UVLO)) or greater than a second reference voltage (for example, over voltage lockout (OVLO)), the electronic device 100 may determine that an abnormal situation occurs. Similarly, when a charging current supplied to the battery 170 is less than a first reference current or greater than a second reference current, the electronic device 100 may determine that an abnormal situation occurs. For example, when a current for charging the battery 170 is supposed to be 1 A but either 500 mA or 1500 mA is supplied, the electronic device 100 may determine that an abnormal situation occurs during wireless charging.

As another example, if the recognition/release of wireless charging is related for a predetermined time, the electronic device 100 may determine that an abnormality occurs during charging. For example, when wireless charging is recognized and released five times within 10 sec (for example, when wireless charging starts and stops), the electronic device 100 may determine that an abnormal situation occurs during wireless charging.

If abnormal charging is not detected, the electronic device 100 may continuously charge the battery 170 in operation 240.

If it is determined that abnormal charging occurs, the electronic device 100 may determine whether it is being used by a user in operation 230 by using at least one sensor. That is, in operation 230, the electronic device 100 may determine whether certain conditions for determining that the electronic device 100 is being used by a user are satisfied. For example, the processor 110 may check a charging state (or charging state information) of the wireless charging module 150 and determine whether the charging state corresponds to a certain condition. If the charging state corresponds to a certain condition, the processor 110 may determine whether the electronic device 100 is being used by a user by using at least one sensor. Examples relating to operation 230 are described below with reference to FIGS. 3, 4, and 5.

When it is determined that the electronic device 100 is being used by a user, the electronic device 100, for example, may not provide a notification and may maintain a charging state in operation 240. This is because a user may put the electronic device 100 at a position for generating the optimized charging efficiency after using the electronic device 100. Additionally, by determining whether the electronic device 100 is used by a user, a task that the current user performs by using the electronic device 100 may not be interrupted or stopped When it is determined that the electronic device 100 is not being used by a user, the electronic device 100 may provide a notification that the current wireless charging is not being performed properly to a user in order to allow the user to recognize it in operation 250. Various notification forms provided from the electronic device 100 are described below with reference to FIGS. 6A to 6D.

Figure 3:
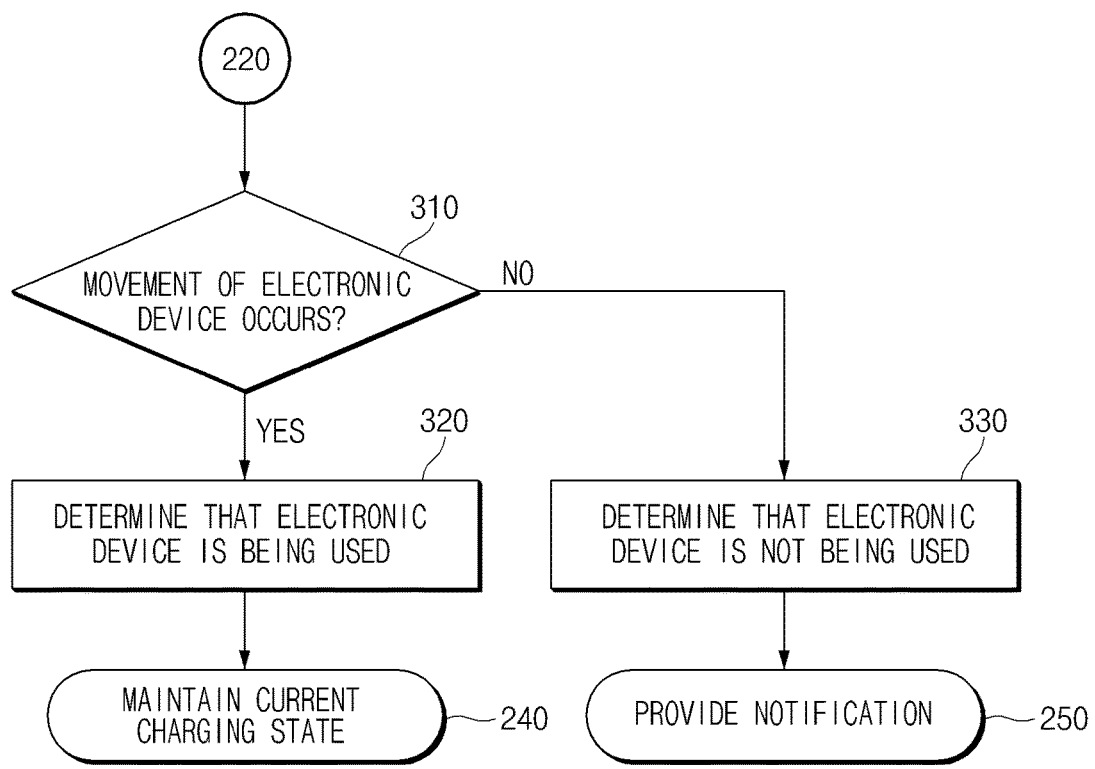
FIG. 3 is a flowchart of a method of providing a notification of a wireless charging state depending on whether an electronic device is being used, according to an embodiment of the present disclosure.

FIG. 3 is a flowchart of a method of providing a notification of a wireless charging state depending on whether an electronic device is being used, according to an embodiment of the present disclosure.

Referring to FIG. 3, in operation 310, the electronic device 100 may determine whether it is being moved. Operation 310, for example, may be performed subsequent to operation 220 of FIG. 2.

The electronic device 100 may include a sensor for detecting movement of the electronic device 100 itself or movement occurs around the electronic device 100, for example, an acceleration sensor, a gyro sensor (for example, a gyroscope sensor), and a gesture sensor. When it is determined that there is movement of the electronic device 100 itself or movement (for example, a user's gesture) around the electronic device 100 by using at least one of an acceleration sensor, a gyro sensor, and a gesture sensor, the electronic device 100 may determine that the electronic device 100 is being used currently in operation 320. When it is determined that the electronic device 100 is being used, the electronic device 100, for example, may maintain the current charging state as in operation 240 in FIG. 2.

If movement relating to the electronic device 100 is not detected, in operation 330 in FIG. 3, the electronic device 100 may determine that the electronic device 100 is not being used currently. When it is determined that the electronic device 100 is not being used, the electronic device 100, for example, may provide a notification to indicate that an abnormal charging situation occurs as in operation 250 in FIG. 2.

Additionally, according to an embodiment of the present disclosure, in determining whether the electronic device 100 is used, when the charging efficiency of the electronic device 100 declines, it is checked whether movement (for example, a vibration due to the text reception of the electronic device 100) of the electronic device 100 itself occurs or a change in an external environmental factor (for example, a movement of a wireless charging pad) occurs. If a movement of the electronic device 100 occurs, it may be determined that the electronic device 100 is not being used and the electronic device 100 may provide a notification.

Figure 4:
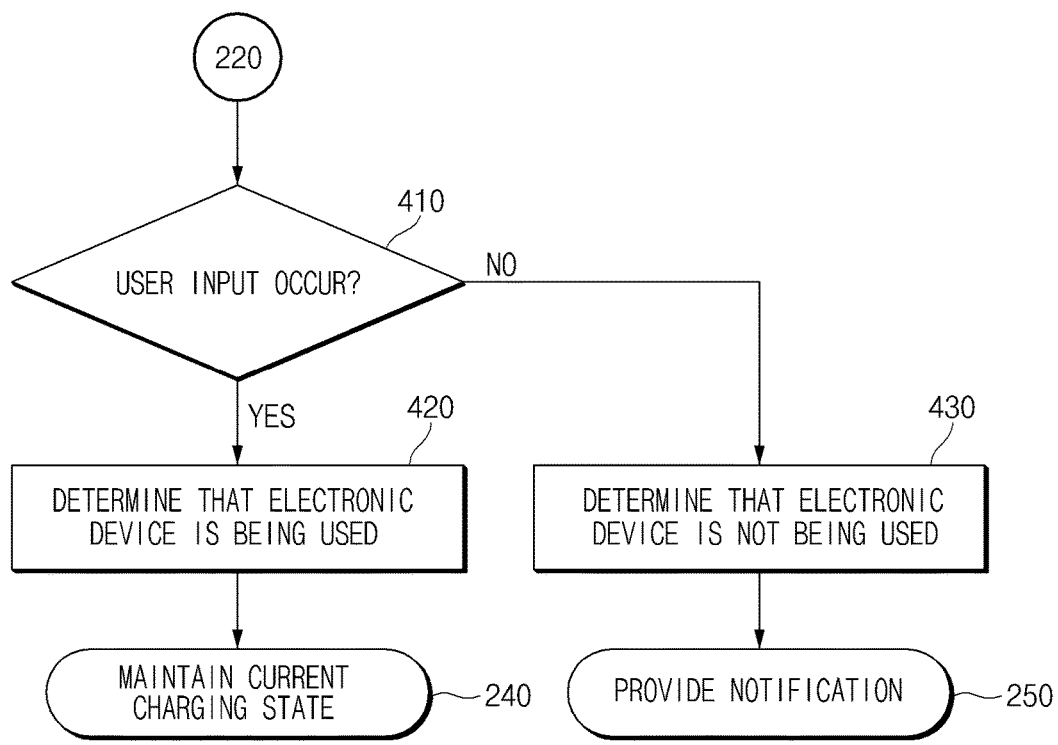
FIG. 4 is a flowchart of a method of providing a notification of a wireless charging state depending on whether an electronic device is being used, according to an embodiment of the present disclosure.

FIG. 4 is a flowchart of a method of providing a notification of a wireless charging state depending on whether an electronic device is being used, according to an embodiment of the present disclosure.

Referring to FIG. 4, in operation 410, the electronic device 100 may determine whether a user input on the electronic device 100 occurs. Operation 410, for example, may be performed subsequent to operation 220 of FIG. 2.

The electronic device 100 may include a sensor for obtaining data through contact with a user's body, for example, a proximity sensor (for example, a grip sensor), a fingerprint recognition sensor, and a heart rate sensor. When data recognition occurs through such a sensor, the electronic device 100 may determine that a user input occurs in operation 410.

As another example, the electronic device 100 may include a touch screen panel. With a touch screen panel, the electronic device 100 may receive a touch input on the surface of the display 130. When a touch input is detected through a touch screen panel, the electronic device 100 may determine that a user input occurs in operation 410.

When a user input is detected through a hardware module such as the above-mentioned various sensors or touch screen panel, the electronic device 100 may determine that it is being used currently in operation 420. In this case, the electronic device 100 may maintain the current charging state as in operation 240 in FIG. 2.

If a user input is not detected, the electronic device 100 may determine that it is not being used currently in operation 430 in FIG. 4. In this case, the electronic device 100 may provide a notification indicating that an abnormal charging situation occurs as in operation 250 in FIG. 2.

Figure 5:
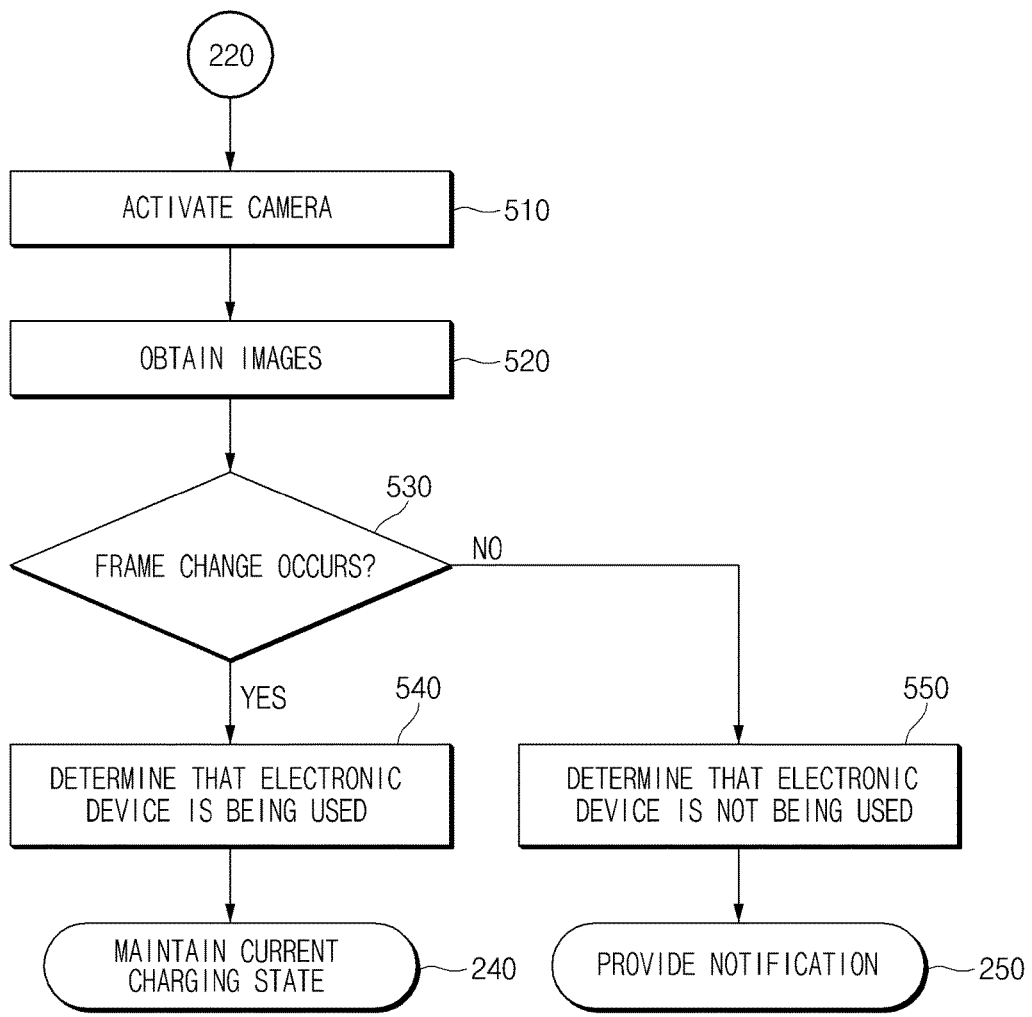
FIG. 5 is a flowchart of a method of providing a notification of a wireless charging state depending on whether an electronic device is being used, according to an embodiment of the present disclosure.

FIG. 5 is a flowchart of a method of providing a notification of a wireless charging state depending on whether an electronic device is being used, according to an embodiment of the present disclosure.

Referring to FIG. 5, when abnormal charging is detected (for example, in operation 220 of FIG. 2), the electronic device 100 may activate a camera function in operation 510 in FIG. 5. If a plurality of cameras (for example, a front camera and a rear camera) are provided as in a smartphone, the electronic device 100 may activate a certain camera module. Alternatively, according to some embodiments of the present disclosure, the electronic device 100 may activate an appropriate camera module depending on whether the display of the electronic device 100 faces down (for example, the floor) or faces up (for example, the ceiling/sky). For example, in the case of wireless charging during which the rear of the electronic device 100 is close to the charging pad 200, the electronic device 100 may activate a front camera in order for image capturing.

In operation 520, the electronic device 100 may obtain images through the activated camera module. Operation 520 may be performed a predetermined number of times. For example, the electronic device 100 may obtain five images at each 1 sec interval. In another example, operation 520 may be performed continuously for a predetermined time. In this case, a video captured by a camera module may be obtained.

In operation 530, the electronic device 100 may check whether a change in frame occurs by comparing frames of images obtained in operation 520. In the case of the above-mentioned example, the electronic device 100 may determine whether the identity is maintained by comparing the obtained five images. For example, if more than 95% of the five images are identical, the electronic device 100 may determine that the identity of the image is maintained (e.g., the image has not changed) and as a result, it is determined that the electronic device 100 is not being used.

If a video is obtained by a camera module, the electronic device 100 may determine whether a change in frame occurs by sampling an arbitrary frame among several frames included in the video, or sampling only an image corresponding to an I-frame.

When it is determined that a change in the level of differences in a frame occurs based on such an image acquisition and frame analysis result, it is determined that the electronic device 100 is being used currently in operation 540. In this case, the electronic device 100 may maintain the current charging state as in operation 240.

If a frame change does not occur (for example, the identity of frames is maintained), it is determined that the electronic device 100 is not being used currently in operation 550. In this case, the electronic device 100 may provide a notification for representing that an abnormal charging situation occurs as in operation 250 in FIG. 2.

The above embodiments are exemplary embodiments for determining whether a user uses an electronic device but are not intended to limit the present disclosure. In addition to the method described above, various examples for determining whether an electronic device is used may be considered. For example, the electronic device 100 may determine whether a user uses an electronic device currently based on the brightness of an illumination sensor or a change in color detected by a color sensor (e.g., a red-green-blue (RGB) sensor).

FIGS. 6A to 6D are top views of an electronic device on a wireless charging pad according to various embodiments of the present disclosure.

Figure 6A:
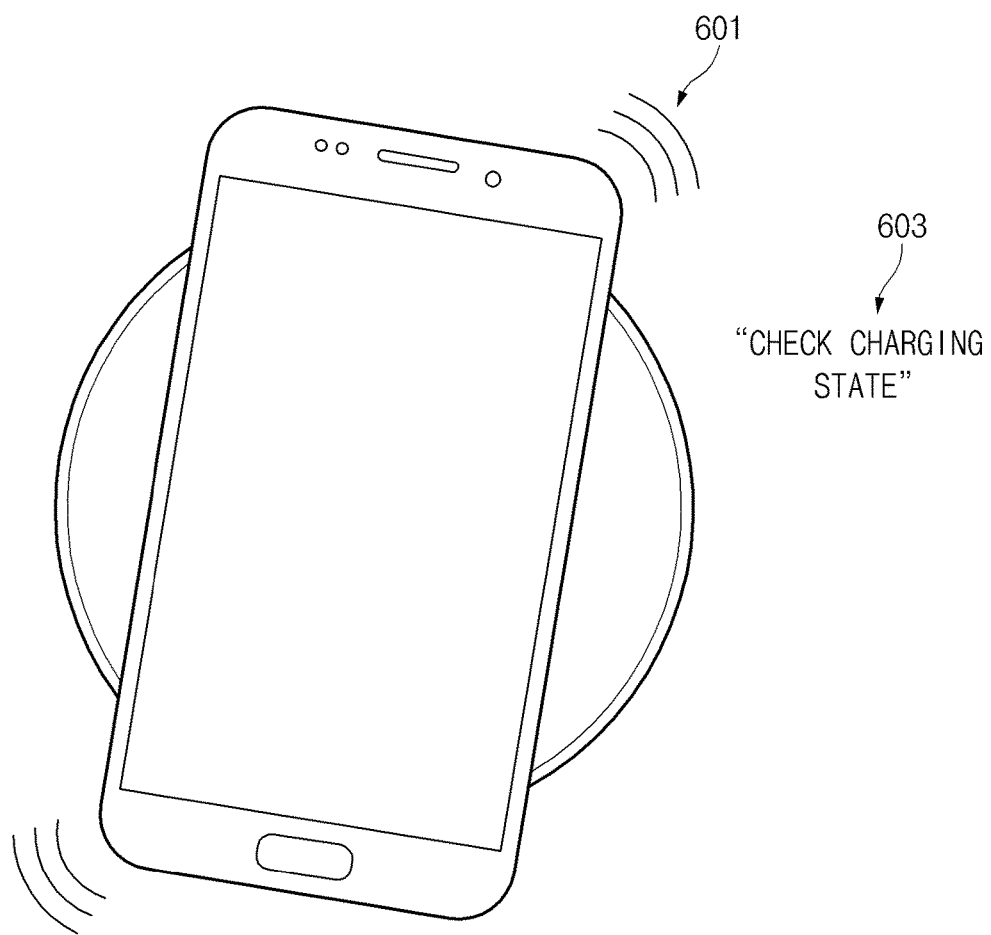
FIGS. 6A to 6D are top views of an electronic device on a wireless charging pad according to embodiments of the present disclosure.

Referring to FIG. 6A, the electronic device 100 may generate a vibration effect 601 by using a vibration module (for example, a motor) for generating vibration. Additionally or alternatively, the electronic device 100 may output a sound (or message) 603 (for example, "CHECK CHARGING STATE") for requesting a check on a charging state, through a speaker.

Figure 6B:
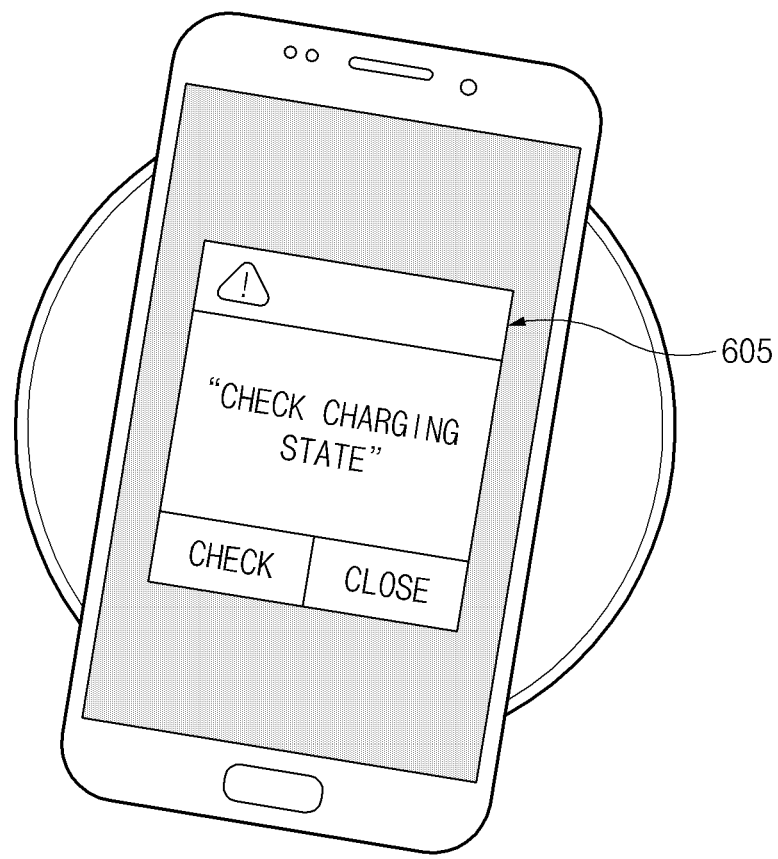

Referring to FIG. 6B, the electronic device 100, for example, may display a pop-up 605 for requesting a check on a charging state in addition to the above-mentioned vibration and/or sound through a display (for example, the display 130 of FIG. 1) that is functionally connected to the electronic device 100. Until a user feedback for the pop-up 605 occurs, the electronic device 100 may provide the above-mentioned sound or vibration effect. The shown pop-up 605 is exemplary and various messages may be displayed in various forms. For example, the electronic device 100 may output a message "since current wireless charging is not performed normally, move the position of the electronic device to the center of charging pad" or output guide information for guiding a desired position of the electronic device 100.

Figure 6C:
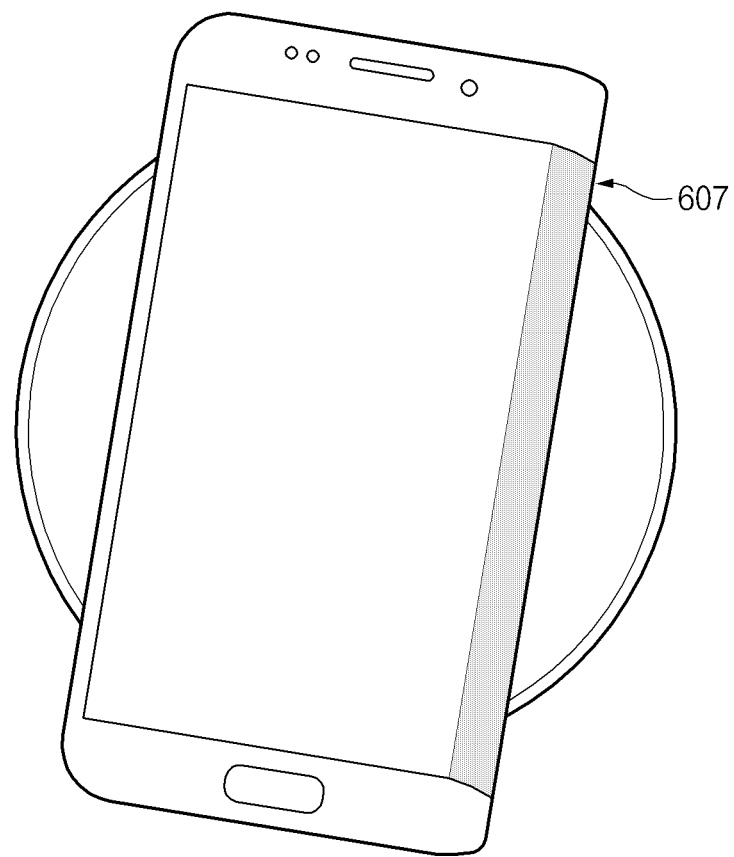

FIG. 6C illustrates an example that a display effect for representing that current charging is not normally performed is displayed on a partial area of a display of the electronic device 100. For example, the electronic device 100 may include a curved display. For example, the electronic device 100 may include a display having a flat area and a curved area 607 extending from at least one side of the flat area. When an abnormal charging state occurs, the electronic device 100 may indicate an abnormal situation by outputting a certain color on the curved area 607. For example, when abnormal charging occurs, the electronic device 100 may output the color red or causing a flickering on the curved area 607.

Figure 6D:
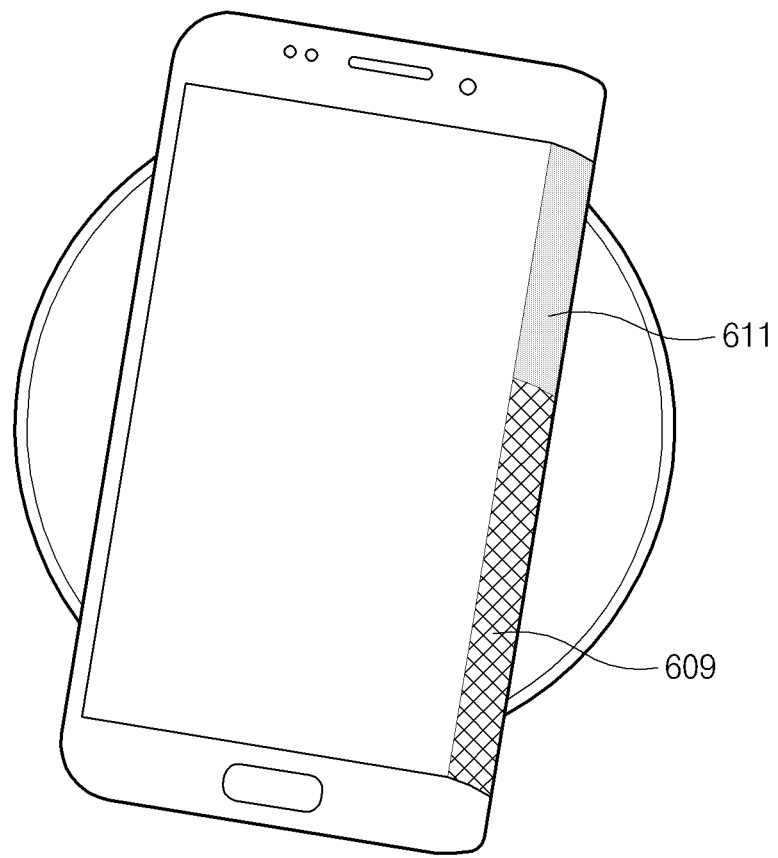

FIG. 6D illustrates another embodiment of FIG. 6C. For example, the electronic device 100 may display a currently charged capacity with respect to the entire battery capacity by using an area ratio of the area 609 for displaying a charging amount with respect to the entire area of a curved area. As shown in FIG. 6C, the color red or another contrast color may be output to the remaining area 611. Alternatively, a ratio of the area 609 to the area 611 may display a matching state. For example, when the electronic device 100 and the charging pad 200 are matched completely, the area 609 of a predetermined color (for example, green) may occupy 100% of the curved area. However, when the electronic device 100 and the charging pad 200 are slightly misaligned, the area 611 having a color (for example, the color red) different from a predetermined color of the area 609 may fill a curved area according to the misalignment. For example, the area 609 occupies 85% of the curved area and the area 611 occupies the remaining 15% of the curved area. After seeing this, a user may appropriately adjust the position of the electronic device 100 in order to allow the area 609 to occupy 100% of the curved area.

Figure 7:
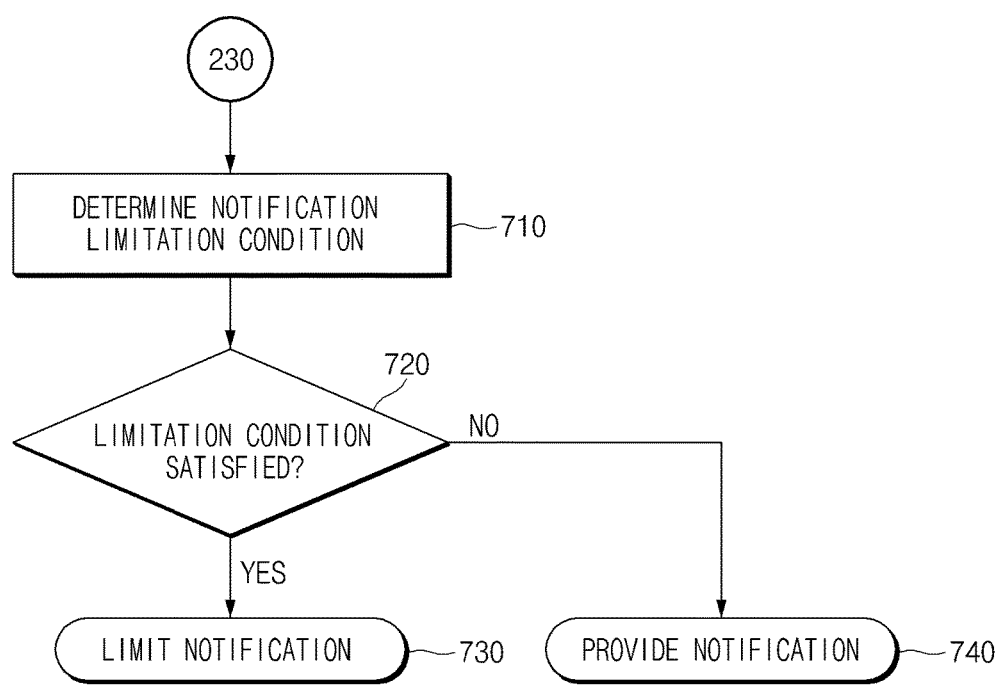
FIG. 7 is a flowchart of a method of limiting a notification according to an embodiment of the present disclosure.

FIG. 7 is a flowchart of a method of limiting a notification according to an embodiment of the present disclosure.

Similar to the above-mentioned embodiments, in a case where a notification is provided according to an abnormal charging situation, if a predetermined condition is satisfied, notification may be limited. For example, the electronic device 100 may not provide notification at night or when a user is sleeping. For example, the electronic device 100 may not provide notification at a certain time (for example, 12:00 a.m. to 06:00 a.m.) or may not provide notification at a corresponding time based on a user's usage pattern collected from the electronic device 100 (for example, a user sleeps from 11:30 p.m. to 07:30 a.m. on average). As another example, when it is determined that the battery 170 is charged sufficiently, for example, when the battery 170 is changed more than 90%, the electronic device 100 may not provide notification.

Referring to FIG. 7, the electronic device 100 may determine a notification limitation condition in operation 710. This operation may be performed when it is determined that the electronic device 100 is not in use in operation 230 of FIG. 2. The notification limitation condition, as described above, may correspond to whether the current time corresponds to a certain time or whether the remaining battery power is greater than a certain level. However, besides that, there may be various notification limitation conditions. For example, the notification limitation condition may be set by a user (for example, if a volume of the electronic device 100 is set to more than a predetermined level or while a certain application is executed, notification may be limited).

According to an embodiment of the present disclosure, the electronic device 100 may use a user's schedule information (for example, a meeting, a movie, and so on) registered in a calendar application of the electronic device 100 or location information of the electronic device 100, as a notification limitation condition. For example, when the notification is determined to occur at a time when an event is scheduled in a calendar application, the electronic device 100 may limit the notification itself, a notification method, or the size of the notification. For example, when a user of the electronic device 100 is in a meeting, the electronic device 100 may not provide a notification of a wireless charging state, or provide a notification through another method other than sound or vibration, or limit the volume of the sound or the intensity of the vibration, provided as a notification, to be lower than a predetermined level. As another example, when it is determined that a user is at a company or in a coffee shop according to a location information based determination result, the electronic device 100 may limit at least one of a notification itself, a notification method, and the size of a notification.

In operation 720, the electronic device 100 may determine whether at least one notification limitation condition is satisfied. If the limitation condition is satisfied, in operation 730, the electronic device 100 may not provide a notification of an abnormal charging state. If there is no item corresponding to the limitation condition, in operation 740, the electronic device 100 may provide a notification of an abnormal charging state.

Figure 8:
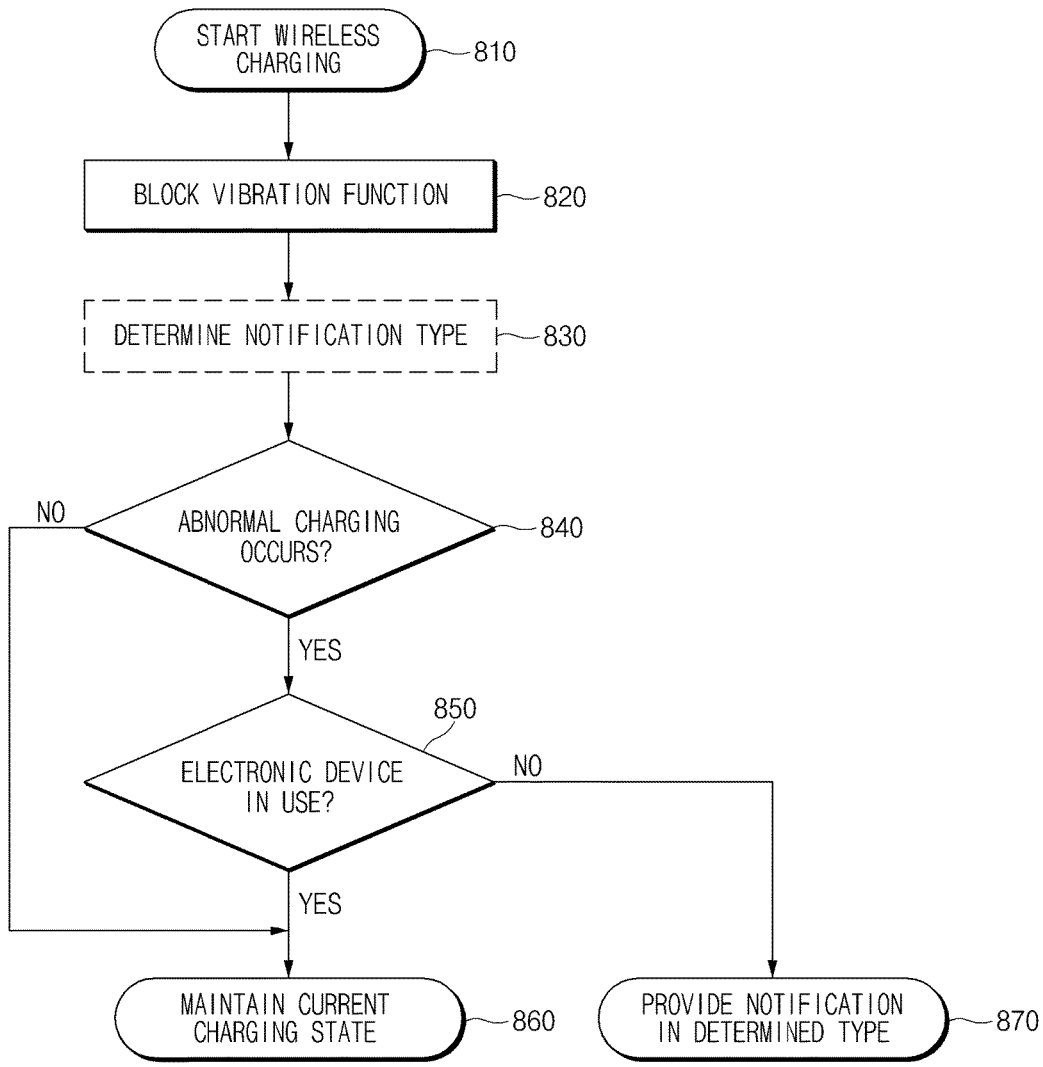
FIG. 8 is a flowchart of a method of determining a notification method and providing a notification depending on whether a vibration of an electronic device is set, according to an embodiment of the present disclosure.

FIG. 8 is a flowchart of a method of determining a notification method and providing a notification depending on whether a vibration of an electronic device is set, according to an embodiment of the present disclosure. Description for contents identical, corresponding, or similar to the contents disclosed above may be omitted.

Referring to FIG. 8, in operation 810, the electronic device 100 may start wireless charging. Operation 810 may correspond to operation 210 of FIG. 2.

In operation 820, the electronic device 100 may block its vibration function in preparation for a situation in which vibration occurs during wireless charging, for example, when the electronic device 100 is in a vibration mode currently, or when a vibration function is activated, or when there is an application using a vibration function among applications in execution. Additionally, according to an embodiment of the present disclosure, the electronic device 100 may limit the intensity of the vibration or the number of vibrations instead of blocking the vibration function. For example, in the case of a conventional vibration notification, when a vibration that is maintained for 3 sec with the intensity of 10 is provided ten times at each 1 sec interval, in relation to a vibration limited according to an embodiment of the present disclosure, a vibration that is maintained for 3 sec with the intensity of 3 is provided five times at each 1 sec interval (for example, a 1 sec recession after 3 sec vibration may be repeated five times). In such a way, the electronic device 100 may prevent a relative position between the electronic device 100 and the power transmission device 200 from being changed by vibration.

In operation 830, when a wireless charging state corresponds to an abnormal state, the electronic device 100 may determine a notification method to be provided. In this case, the notification method using the same vibration function as in FIG. 6A may be excluded.

Although it is shown in FIG. 8 that operation 830 is performed after operation 820, operation 830 may be performed after another appropriate operation. For example, operation 830 may be performed after operation 850 is performed and before operation 870 is performed.

In operation 840, the electronic device 100 may determine whether an abnormal charging situation occurs. Operation 840 may correspond to operation 220 in FIG. 2. Additionally, operation 850 in FIG. 8 for determining whether the electronic device 100 is in use may correspond to operation 230 in FIG. 2 described above. When operation 840 and operation 850 in FIG. 8 are each satisfied, the electronic device 100 may maintain a wireless charging state continuously. However, when it is determined in operation 850 that the electronic device 100 is not in use, in operation 870, the electronic device 100 may provide a notification through the method determined by operation 830.

Figure 9:
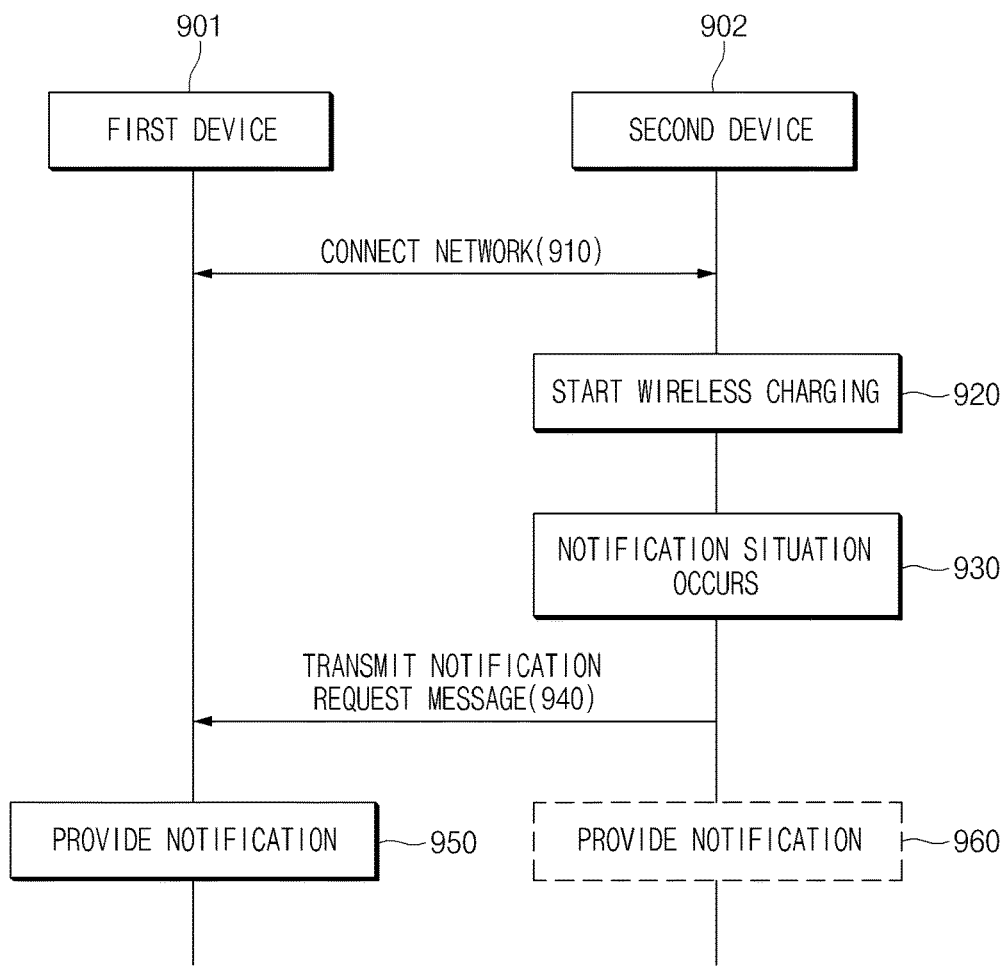
FIG. 9 is a flow diagram of a method of providing a notification of a wireless charging state by using a plurality of electronic devices, according to an embodiment of the present disclosure.

FIG. 9 is a flow diagram of a method of providing a notification of a wireless charging state by using a plurality of electronic devices, according to an embodiment of the present disclosure.

As smart computing devices such as tablets and wearable devices in addition to smartphones are becoming more prevalent, a user may use two or more smart computing devices simultaneously. For example, a user may use a tablet and a smartphone, a smartphone and a smart watch, a tablet and a smart watch, or a smartphone and a laptop PC together. The devices described above may be connected via a network and interlocked with each other through a user account.

Referring to FIG. 9, for example, a first device 901 may be a smart watch and a second device 902 may be a smartphone. The first device 901 and the second device 902 may be connected in advance via a network (for example, BT), in operation 910.

In operation 920, wireless charging for the second device 902 (for example, a smartphone) may start. Until the second device 902 is charged, a user may perform an operation such as checking a message, making a call, or searching for information by using the first device 901 (for example, a smart watch).

By the process of FIG. 2 described above or by another process, for example, a notification situation may occur in the second device 902 as in operation 930. However, a user may not be interested in the second device 902 or may be located a substantial distance away from the second device 902. In this case, in operation 940, the second device 902 may transmit a notification request message to the first device 901. In operation 950, based on the received notification request message, the first device 901 may provide a notification that the current wireless charging of the second device 902 is not performed normally. Moreover, when a notification is provided to the first device 901, a notification may be provided to the second device 902 in operation 960 at the same time.

Figure 10:
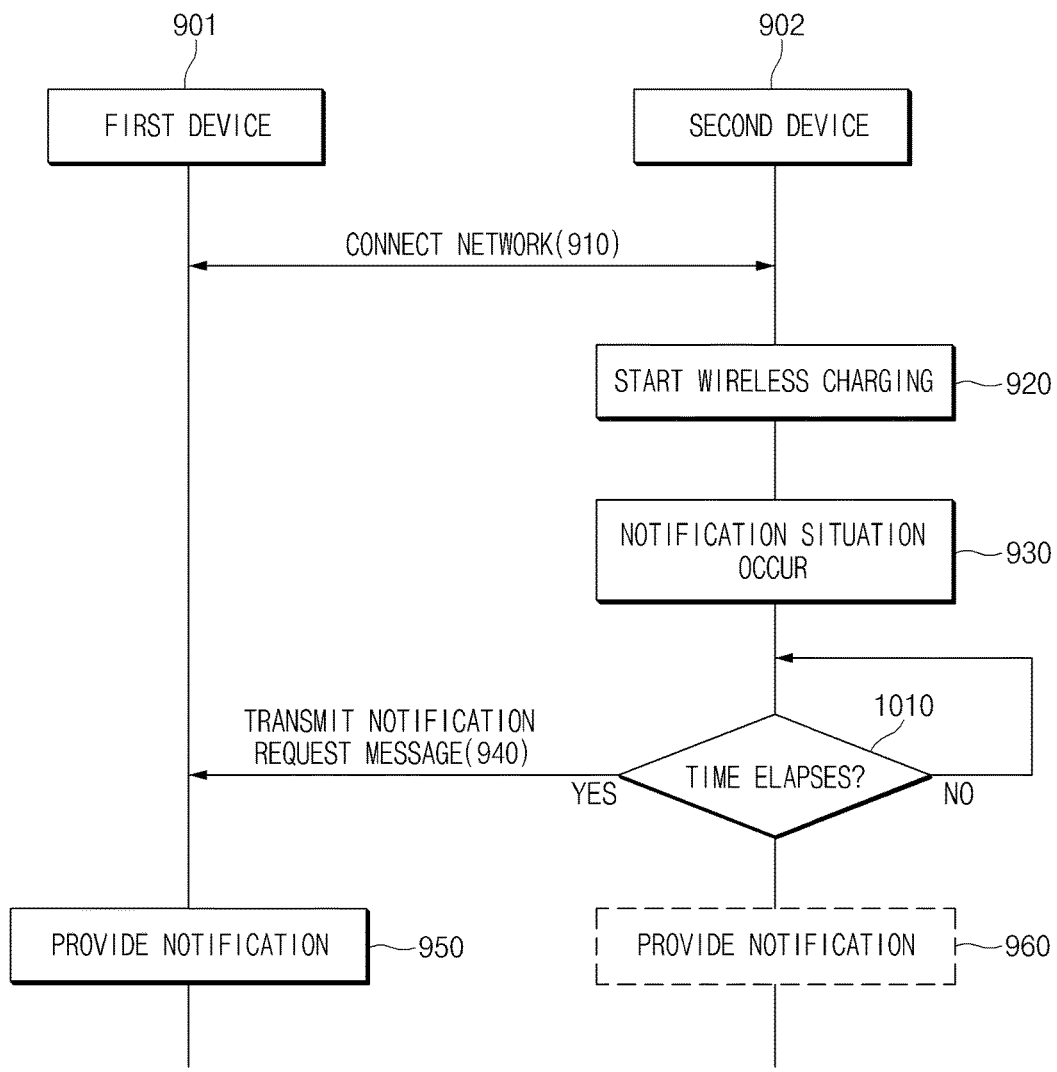
FIG. 10 is a flow diagram of a method of providing a notification of a wireless charging state by using a plurality of electronic devices, according to an embodiment of the present disclosure.

FIG. 10 is a flow diagram of a method of providing a notification of a wireless charging state by using a plurality of electronic devices, according to an embodiment of the present disclosure. Except for some operations, it is understood that the embodiment of FIG. 10 corresponds to the embodiment of FIG. 9.

In the embodiment of FIG. 10, unlike the embodiment of FIG. 9, even if a notification situation occurs in the second device 902 in operation 930, a notification request message is not instantly transmitted to the first device 901. Instead, in operation 1010, until a predetermined time elapses when the second device 902 provides a notification, the process may wait for a user's feedback (for example, adjusting the position of the second device 902 or providing a feedback (for example, a touch input) on a pop-up displayed on the second device 902). If a user feedback for the second device 902 is not provided until a predetermined time elapses, the second device 902 may transmit a notification request message to the first device 901 in operation 940. An operation after that may correspond to the above-mentioned embodiment of FIG. 9.

A notification providing method configured with reference to FIG. 9 or FIG. 10 may be utilized variously. For example, when working with a notebook as charging a mobile phone with a wireless charging pad at a coffee shop, a user may concentrate on the notebook. In some cases, a mobile phone disposed on a charging pad may be out of sight due to a notebook. In such a case, a mobile phone is not charged normally and even if a notification for that is provided to the mobile phone, a user may not recognize the notification. However, when a message that charging for a mobile phone is not performed normally is output to a notebook's screen, a user may attempt efficient wireless charging by adjusting the position of the mobile phone.

According to an embodiment of the present disclosure, based on whether an electronic device being wireless charged is connected (for example, coupled to or paired with) to another electronic device via a network, a notification providing method may be configured differently. For example, if there is no other device connected to an electronic device being wireless charged via a network, a corresponding electronic device may provide a notification. However, if there is another device connected to an electronic device being wireless charged via a network, the electronic device being wireless charged may determine that the other device provides a notification (or both two devices provide a notification).

According to an embodiment of the present disclosure, when the above-mentioned abnormal charging situation (for example, charging off) occurs, the electronic device 100 may analyze a corresponding abnormal phenomenon. For example, the processor 110 or a charging off phenomenon analysis module may analyze a charging operation before a corresponding abnormal phenomenon, and partially adjust a charging value based on an analysis result. For example, an analysis module may analyze a charging input voltage, a consumption current, a charging current, a heat generation state, a battery voltage, and a charging efficiency. During recharging, an analysis module may perform recharging by applying a voltage or a current value different from that of previous charging, based on the analysis result. In this case, the notification limitation condition described above in relation to FIGS. 7 and 8 may be used together with the analysis result in order to reset a reference value for providing a notification.

A method of providing a notification of a wireless charging state in an electronic device according to an embodiment of the present disclosure may include wirelessly charging the electronic device by using a power for the electronic device received from an external device; checking a state of the wireless charging; when the state of the wireless charging corresponds to a certain condition, determining whether the electronic device is used by a user by using at least one sensor; and providing a notification based on whether the electronic device is used.

Providing the notification based on whether the electronic device is used may include, when it is determined that the electronic device is used by the user, not providing the notification; and when it is determined that the electronic device is not used by the user, providing the notification.

The method may further include, when the wireless charging starts, blocking a vibration function of the electronic device; and determining a provision type of the notification. Herein, the notification may be provided in the determined type.

Additionally, providing the notification may include determining whether a predetermined notification limitation condition is satisfied; when the notification limitation condition is satisfied, not providing the notification; and when the notification limitation condition is not satisfied, providing the notification.

Figure 11:
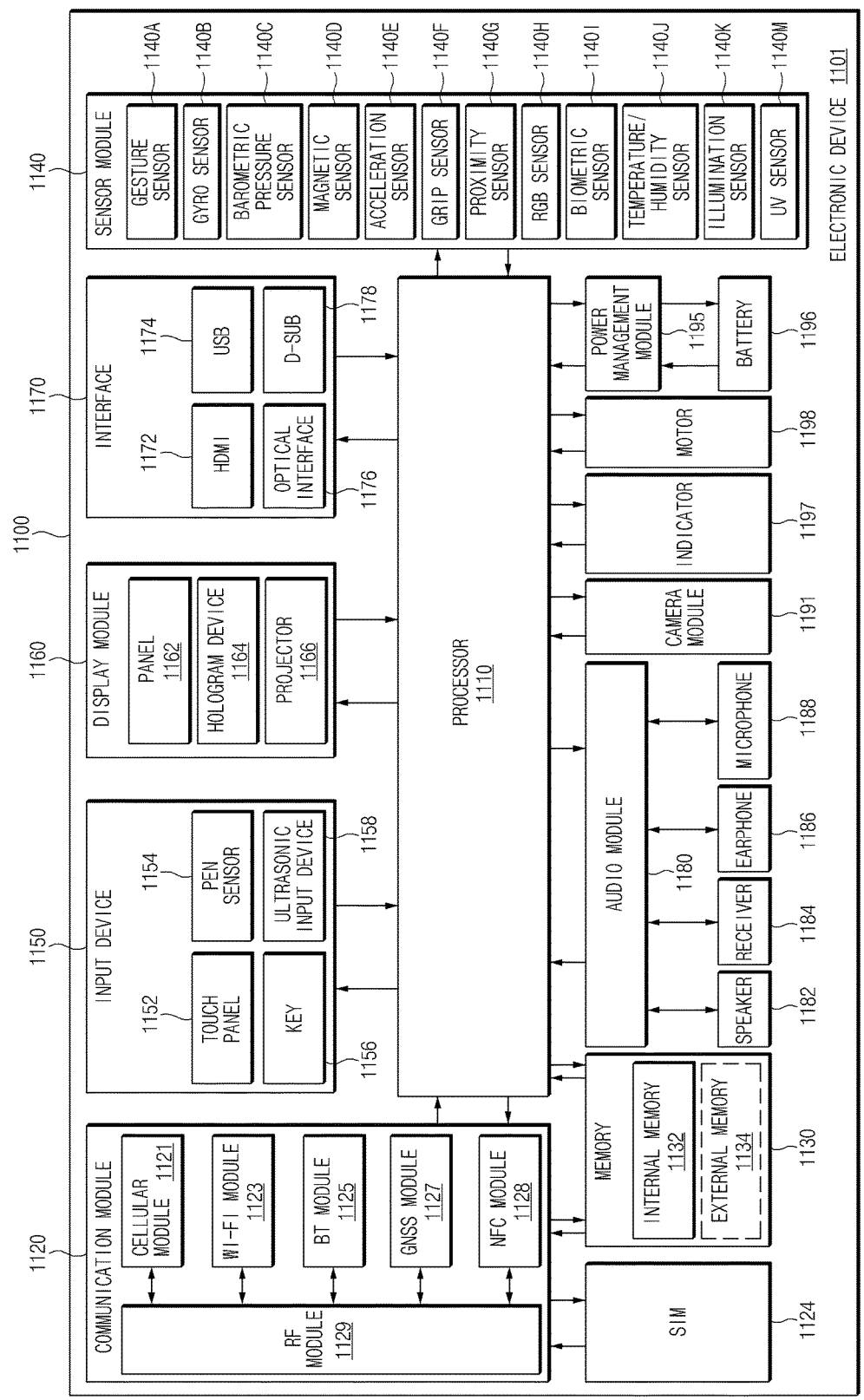
FIG. 11 is a block diagram of an electronic device according to an embodiment of the present disclosure.

FIG. 11 is a block diagram of an electronic device 1101 according to various embodiments of the present disclosure.

Referring to FIG. 11, the electronic device 1101, for example, may include all or part of the electronic device 100 described above and shown in FIG. 1. The electronic device 1101 may include at least one processor 1110 (for example, an AP), a communication module 1120, a subscriber identification module (SIM) 1124, a memory 1130, a sensor module 1140, an input device 1150, a display 1160, an interface 1170, an audio module 1180, a camera module 1191, a power management module 1195, a battery 1196, an indicator 1197, and a motor 1198.

The processor 1110 may control a plurality of hardware or software components connected thereto and may also perform various data processing and operations by executing an operating system or an application program. The processor 1110 may be implemented with a system on chip (SoC), for example. According to an embodiment of the present disclosure, the processor 1110 may further include a graphics processing unit (GPU) and/or an image signal processor. The processor 1110 may include at least part (for example, the cellular module 1121) of components shown in FIG. 11. The processor 1110 may load commands or data received from at least one of the other components (for example, a nonvolatile memory), process them, and store various data in a nonvolatile memory.

The communication module 1120 may have the same or similar configuration as the communication module 180 of FIG. 1. The communication module 1120, for example, may include a cellular module 1121, a Wi-Fi module 1123, a Bluetooth module 1125, a global navigation satellite system (GNSS) module 1127 (for example, a global positioning system (GPS) module, a global orbiting navigation satellite system (Glonass) module, a Beidou navigation satellite system (Beidou) module, or a European GNSS (Galileo) module), an NFC module 1128, and a radio frequency (RF) module 1129.

The cellular module 1121, for example, may provide voice call, video call, text service, or internet service through a communication network. According to an embodiment of the present disclosure, the cellular module 1121 may perform a distinction and authentication operation on the electronic device 1101 in a communication network by using a SIM (for example, a SIM card) 1124. The cellular module 1121 may perform at least part of a function that the processor 1110 provides. The cellular module 1121 may further include a CP.

Each of the Wi-Fi module 1123, the Bluetooth module 1125, the GNSS module 1127, or the NFC module 1128 may include a processor for processing data transmitted/received through a corresponding module. According to an embodiment of the present disclosure, at least part (for example, at least one) of the cellular module 1121, the Wi-Fi module 1123, the Bluetooth module 1125, the GNSS module 1127, and the NFC module 1128 may be included in one integrated circuit (IC) or IC package.

The RF module 1129, for example, may transmit/receive communication signals (for example, RF signals). The RF module 1129, for example, may include a transceiver, a power amplifier module (PAM), a frequency filter, a low noise amplifier (LNA), or an antenna. According to an embodiment of the present disclosure, at least one of the cellular module 1121, the Wi-Fi module 1123, the Bluetooth module 1125, the GNSS module 1127, and the NFC module 1128 may transmit/receive RF signals through a separate RF module.

The SIM 1124, for example, may include a card including a SIM and/or an embedded SIM and also may include unique identification information (for example, an integrated circuit card identifier (ICCID)) or subscriber information (for example, an international mobile subscriber identity (IMSI)).

The memory 1130 (for example, the memory 120 of FIG. 1) may include an internal memory 1132 or an external memory 1134. The internal memory 1132 may include at least one of a volatile memory (for example, a dynamic random access memory (DRAM), a static RAM (SRAM), a synchronous DRAM (SDRAM)) and a non-volatile memory (for example, a one-time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash memory), a hard drive, or a solid state drive (SSD)).

The external memory 1134 may further include a flash drive, for example, a compact flash (CF) drive, a secure digital (SD) card, a micro Micro-SD card, a Mini-SD card, an extreme digital (xD) card, multimedia card (MMC), or a memory stick. The external memory 1134 may be functionally and/or physically connected to the electronic device 1101 through various interfaces.

The sensor module 1140 measures physical quantities or detects an operating state of the electronic device 1101, thereby converting the measured or detected information into electrical signals. The sensor module 1140 may include at least one of a gesture sensor 1140A, a gyro sensor 1140B, a barometric pressure sensor 1140C, a magnetic sensor 1140D, an acceleration sensor 1140E, a grip sensor 1140F, a proximity sensor 1140G, a color sensor 1140H (for example, an RGB sensor), a biometric sensor 1140I, a temperature/humidity sensor 1140J, an illumination sensor 1140K, and an ultra violet (UV) light sensor 1140M. Additionally or alternatively, the sensor module 1140 may include an electronic nose (E-nose) sensor, an electromyography (EMG) sensor, an electroencephalogram (EEG) sensor, an electrocardiogram (ECG) sensor, an infrared (IR) sensor, an iris sensor, or a fingerprint sensor. The sensor module 1140 may further include a control circuit for controlling at least one sensor therein. According to an embodiment of the present disclosure, the electronic device 1101 may further include a processor configured to control the sensor module 1140 as part of or separately from the processor 1110 and thus may control the sensor module 1140 while the processor 1110 is in a sleep state.

The input device 1150 may include a touch panel 1152, a (digital) pen sensor 1154, a key 1156, or an ultrasonic input device 1158. The touch panel 1152 may use at least one of a capacitive, a resistive, an infrared, or an ultrasonic method, for example. Additionally, the touch panel 1152 may further include a control circuit. The touch panel 1152 may further include a tactile layer to provide a tactile response to a user.

The (digital) pen sensor 1154, for example, may include a sheet for recognition as part of a touch panel or a separate sheet for recognition. The key 1156 may include a physical button, an optical key, or a keypad, for example. The ultrasonic input device 1158 may detect ultrasonic waves generated from an input tool through a microphone (for example, the microphone 1188) in order to check data corresponding to the detected ultrasonic waves.

The display 1160 (for example, the display 130 of FIG. 1) may include a panel 1162, a hologram device 1164, or a projector 1166. The panel 1162 may have the same or similar configuration as the display 130 of FIG. 1. The panel 1162 may be implemented to be flexible, transparent, or wearable, for example. The panel 1162 and the touch panel 1152 may be configured as one module. The hologram device 1164 may show three-dimensional images in the air by using the interference of light. The projector 1166 may display an image by projecting light onto a screen. The screen, for example, may be placed internal or external to the electronic device 1101. According to an embodiment of the present disclosure, the display 1160 may further include a control circuit for controlling the panel 1162, the hologram device 1164, or the projector 1166.

The interface 1170 may include a high-definition multimedia interface (HDMI) 1172, a universal serial bus (USB) 1174, an optical interface 1176, or a D-subminiature (D-sub) connector 1178, for example. The interface 1170, for example, may be included in the communication module 180 shown in FIG. 1. Additionally or alternatively, the interface 1170 may include a mobile high-definition link (MHL) interface, an SD) card/MMC interface, or an Infrared Data Association (IrDA) standard interface.

The audio module 1180 may convert sound into electrical signals and may convert electrical signals into sounds. At least some components of the audio module 1180, for example, may be included in the input/output interface 150 shown in FIG. 1. The audio module 1180 may process sound information input/output through a speaker 1182, a receiver 1184, an earphone 1186, or a microphone 1188.

The camera module 1191, as a device for capturing a still image and a video, may include at least one image sensor (for example, a front sensor or a rear sensor), a lens, an image signal processor (ISP), or a flash (for example, an LED or a xenon lamp).

The power management module 1195 may manage the power of the electronic device 1101. According to an embodiment of the present disclosure, the power management module 1195 may include a power management IC (PMIC), a charger IC, or a battery gauge, for example. The PMIC may have a wired and/or wireless charging method. For the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of battery power in the battery 1196, or a voltage, current, or temperature thereof during charging. The battery 1196, for example, may include a rechargeable battery and/or a solar battery.

The indicator 1197 may display a certain state of the electronic device 1101 or part thereof (for example, the processor 1110), for example, a booting state, a message state, or a charging state. The motor 1198 may convert electrical signals into mechanical vibration and may generate a vibration or a haptic effect. The electronic device 1101 may include a processing device (for example, a GPU) for mobile TV support. A processing device for mobile TV support may process media data according to the standards such as digital multimedia broadcasting (DMB), digital video broadcasting (DVB), or mediaFLO™.

Each of the above-mentioned components of the electronic device 1101 according to various embodiments of the present disclosure may be configured with at least one component and the name of a corresponding component may vary according to the type of the electronic device 1101. The electronic device 1101 may include at least one of the above-mentioned components, may not include some of the above-mentioned components, or may further include another component. Additionally, some of components in the electronic device 1101 may be configured as one entity, so that functions of previous corresponding components are performed identically.

Figure 12:
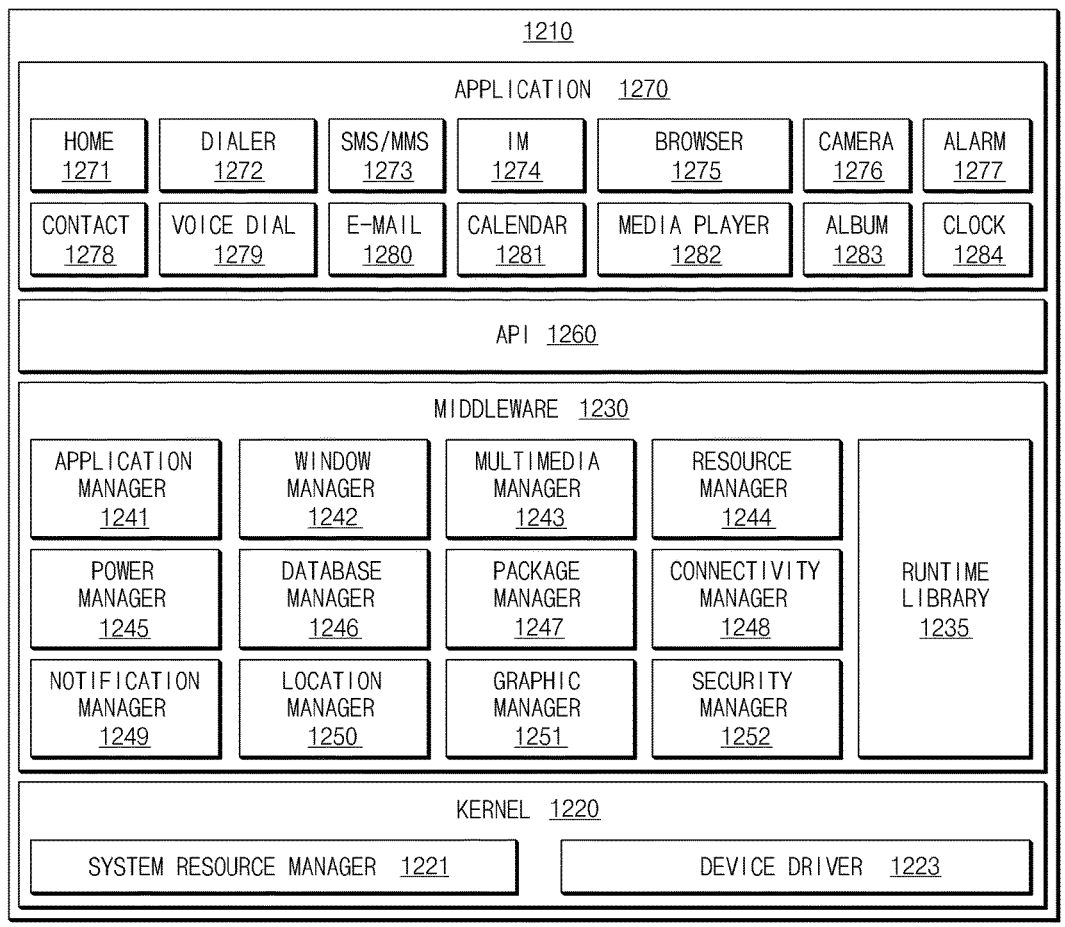
FIG. 12 is a block diagram of a program module according to an embodiment of the present disclosure.

FIG. 12 is a block diagram of a program module 1210 according to an embodiment of the present disclosure.

Referring to FIG. 12, the program module 1210 may include an OS for controlling a resource relating to an electronic device (for example, the electronic device 100 of FIG. 1) and/or various applications running on the OS. The OS, for example, may include Android®, iOS®, Windows®, Symbian™, and Tizen®.

The program module 1210 may include a kernel 1220, a middleware 1230, an API 1260, and/or an application 1270. At least part of the program module 1210 may be preloaded on an electronic device or may be downloaded from an external electronic device.

The kernel 1220, for example, may include a system resource manager 1221 or a device driver 1223. The system resource manager 1221 may perform the control, allocation, or retrieval of a system resource. According to an embodiment of the present disclosure, the system resource manager 1221 may include a process management unit, a memory management unit, or a file system management unit. The device driver 1223, for example, may include a display driver, a camera driver, a Bluetooth driver, a sharing memory driver, a USB driver, a keypad driver, a Wi-Fi driver, an audio driver, or an inter-process communication (IPC) driver.

The middleware 1230, for example, may provide a function that the application 1270 also requires, or may provide various functions to the application 1270 through the API 1260 in order to allow the application 1270 to efficiently use a limited system resource inside the electronic device. According to an embodiment of the disclosure, the middleware 1230 may include at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, and a security manager 1252.

The runtime library 1235, for example, may include a library module that a complier uses to add a new function through a programming language while the application 1270 is running. The runtime library 1235 may perform a function concerning input/output management, memory management, or an arithmetic function.

The application manager 1241, for example, may mange the life cycle of at least one application among the applications 1270. The window manager 1242 may manage a graphical user interface (GUI) resource used in a screen. The multimedia manager 1243 may recognize a format for playing various media files and may encode or decode a media file by using a coder/decoder (codec) corresponding to a corresponding format. The resource manager 1244 may manage a resource such as source code, memory, or storage space of at least one application in the application 1270.

The power manager 1245, for example, may operate together with a basic input/output system (BIOS) to manage the battery or power and may provide power information necessary for an operation of the electronic device. The database manager 1246 may create, search, or modify a database used in at least one application in the application 1270. The package manager 1247 may manage the installation or update of an application distributed in a package file format.

The connectivity manger 1248 may manage a wireless connection such as Wi-Fi or Bluetooth. The notification manager 1249 may display or notify of an event such as the arrival of messages, appointments, and proximity alerts to a user in a manner to not interrupt the user. The location manager 1250 may manage location information on an electronic device. The graphic manager 1251 may manage a graphic effect to be provided to a user or a user interface relating thereto. The security manager 1252 may provide various security functions necessary for system security or user authentication. According to an embodiment of the present disclosure, when an electronic device (for example, the electronic device 100 of FIG. 1) includes a phone function, the middleware 1230 may further include a telephony manager for managing a voice or video call function of the electronic device.

The middleware 1230 may include a middleware module for forming a combination of various functions of the above-mentioned components. The middleware 1230 may provide a module specialized for each type of OS to provide differentiated functions. Additionally, the middleware 1230 may delete part of existing components or add new components dynamically.

The API 1260, for example, as a set of API programming functions, may be provided as another configuration according to an OS. For example, in the case of Android® or iOS®, one API set may be provided for each platform and in the case Tizen®, at least two API sets may be provided for each platform.

The application 1270, for example, may include at least one application for performing functions such as a home application 1271, a dialer application 1272, a short message service/multimedia messaging service (SMS/MMS) application 1273, an instant message application 1274, a browser application 1275, a camera application 1276, an alarm application 1277, a contact application 1278, a voice dial application 1279, an e-mail application 1280, a calendar application 1281, a media player application 1282, an album application 1283, a clock application 1284, a health care application (for example, measuring an amount of exercise or a blood sugar level), or an environmental information application (for example, providing air pressure, humidity, or temperature information).

According to an embodiment of the present disclosure, the application 1270 may include an information exchange application for supporting information exchange between the electronic device (for example, the electronic device 100 of FIG. 1) and an external electronic device. The information exchange application, for example, may include a notification relay application for relaying certain information to the external device or a device management application for managing the external electronic device.

For example, the notification relay application may have a function for relaying, to an external electronic device, notification information occurring from another application (for example, the SMS/MMS application 1273, the e-mail application 1280, the health care application, or the environmental information application) of the electronic device. Additionally, the notification relay application may receive notification information from an external electronic device and may then provide the received notification information to a user.

The device management application, for example, may manage (for example, install, delete, or update) at least one function (for example, turn-on/turn off of the external electronic device itself (or some components) or the brightness (or resolution) adjustment of a display) of an external electronic device communicating with the electronic device, an application operating in the external electronic device, or a service (for example, call service or message service) provided from the external device.

According to an embodiment of the disclosure, the application 1270 may include a certain application (for example, a health care application of a mobile medical device) according to the property of an external electronic device. The application 1270 may include an application received from an external electronic device. The application 1270 may include a preloaded application or a third party application downloadable from a server. The names of components in the program module 1210 according to the shown embodiment may vary depending on the type of OS.

According to various embodiments of the present disclosure, at least part of the program module 1210 may be implemented with software, firmware, hardware, or a combination thereof. At least part of the program module 1210, for example, may be implemented (for example, executed) by a processor (for example, the processor 1110). At least part of the program module 1210 may include a module, a program, a routine, sets of instructions, or a process to perform at least one function, for example.

The term "module" used in various embodiments of the present disclosure, for example, may indicate a unit including a combination of at least one of hardware, software, and firmware. The terms "module," "unit," "logic," "logical block," "component," or "circuit" may be interchangeably used. The term "module" may refer to a minimum unit or part of an integrally configured component. The term "module" may refer to a minimum unit performing at least one function or part thereof. The term "module" may refer to a component implemented mechanically or electronically. For example, the term "module" according to various embodiments of the present disclosure may refer to a component that includes at least one of an application-specific integrated circuit (ASIC) performing certain operations, field-programmable gate arrays (FPGAs), or a programmable-logic device, all of which are known or may be developed in the future.

According to various embodiments of the present disclosure, at least part of a device (for example, modules or functions thereof) or a method (for example, operations), for example, as in a form of a programming module, may be implemented using an instruction stored in a non-transitory computer-readable storage medium. When at least one processor (for example, the processor 110 in FIG. 1) executes an instruction, it may perform a function corresponding to the instruction. The non-transitory computer-readable storage medium may include the memory 120 of FIG. 1, for example.

Non-transitory computer-readable storage media may include hard disks, floppy disks, magnetic media (for example, magnetic tape), optical media (for example, a compact disk ROM (CD-ROM), and a digital versatile disc (DVD)), magneto-optical media (for example, a floptical disk), and hardware devices (for example, a ROM, a RAM, or a flash memory). Additionally, a program instruction may include high-level language code executable by a computer using an interpreter in addition to machine language code generated by a complier. The hardware device may be configured to operate as at least one software module to perform an operation of various embodiments of the present disclosure and vice versa.

In relation to a storage medium for storing a computer readable instruction, the instruction, when executed by a processor of an electronic device, may allow the electronic device to perform wirelessly charging of the electronic device by using power received from an external device; checking a state of wireless charging; when the state of wireless charging corresponds to a certain condition, determining whether the electronic device is used by a user by using at least one sensor; and providing a notification based on whether the electronic device is used. In addition, instructions for performing the above-mentioned various methods may be stored in the storage medium.

A module or a programming module according to various embodiments of the present disclosure may include at least one of the components described above, may not include some of the components described above, or may further include another component. Operations performed by a module, a programming module, or other components according to various embodiments of the present disclosure may be executed through a sequential, parallel, repetitive or heuristic method. Additionally, some operations may be executed in a different order or may be omitted. In addition, other operations may be added.

According to various embodiments of the present disclosure, when wireless charging of an electronic device is not performed properly, an appropriate notification may be provided according to a state of the electronic device. In addition, various effects obtained through the present disclosure may be provided.

Moreover, the embodiments of the present disclosure are provided for the description and understanding of present disclosure but are not intended to limit the present disclosure. Although a few embodiments have been described, those skilled in the art will readily appreciate that many modifications are possible without materially departing from the novel teachings and advantage. Accordingly, all such modifications are intended to be included within the scope of the present disclosure as defined by the appended claims and their equivalents.

What is claimed is:

1. An electronic device for supporting wireless charging, the electronic device comprising:
    at least one sensor configured to detect whether the electronic device is used by a user;
    a wireless charging module configured to charge the electronic device by using power obtained from an external device; and
    a processor functionally connected to the at least one sensor and the wireless charging module,
    wherein the processor is configured to check charging state information of the wireless charging module, determine whether the electronic device is used by the user by using the at least one sensor when the charging state information corresponds to a certain condition, and provide a notification based on whether the electronic device is used by the user.

2. The electronic device of claim 1, wherein when a charging voltage is less than a first reference voltage or greater than a second reference voltage, or when a charging current is less than a first reference current or greater than a second reference current, the processor is further configured to determine that the charging state information corresponds to the certain condition.

3. The electronic device of claim 1, wherein when the charging of the electronic device is released more than a certain number of times within a certain time duration, the processor is further configured to determine that the charging state information corresponds to the certain condition.

4. The electronic device of claim 1, further comprising a motor configured to generate a vibration effect, wherein the processor is further configured to provide at least one vibration effect and sound as the notification.

5. The electronic device of claim 1, further comprising a display, wherein the processor is further configured to display a notification message on the display.

6. The electronic device of claim 1, further comprising a display including a flat area and a curved area extending from one side of the flat area, wherein the processor is further configured to output a color concerning the charging state to the curved area.

7. The electronic device of claim 1, wherein the processor is further configured to reset a reference value for providing the notification by analyzing the charging state information.

8. The electronic device of claim 1, wherein the processor is further configured to determine whether the electronic device satisfies at least one condition that limits the notification and when the at least one condition is satisfied based on the determination, the processor is further configured to limit the notification.

9. The electronic device of claim 8, wherein the at least one condition that limits the notification corresponds to at least one of whether a current time corresponds to a certain time duration, whether a remaining amount of battery power of a battery functionally connected to the electronic device is greater than a certain level, location information of the electronic device, and schedule information of the user.

10. The electronic device of claim 1, wherein the at least one sensor comprises at least one of an acceleration sensor, a gyroscope sensor, and a gesture sensor; and wherein the processor is further configured to provide the notification when there is no movement of the electronic device detected by the at least one sensor.

11. The electronic device of claim 1, wherein the at least one sensor comprises at least one of a proximity sensor, a fingerprint recognition sensor, and a heart rate sensor; and wherein the processor is further configured to provide the notification when data recognition through the at least one sensor does not occur.

12. The electronic device of claim 1, wherein the at least one sensor comprises a touch screen panel; and wherein the processor is further configured to provide the notification when a touch input on the touch screen panel is not detected.

13. The electronic device of claim 1, wherein the at least one sensor comprises a camera module; and wherein the processor is further configured to provide the notification based on a frame change of an image obtained by the camera module.

14. The electronic device of claim 1, further comprising a communication module configured to establish a connection between the electronic device and a second external device; and wherein the processor transmits a notification request message for allowing the electronic device to provide the notification to the second external device.

15. The electronic device of claim 14, wherein when a feedback concerning the notification provided from the electronic device does not occur for a certain time, the processor is further configured to transmit the notification request message to the second external device.

16. A method of providing a notification on a wireless charging state in an electronic device, the method comprising:
wirelessly charging the electronic device by using power received from an external device;
checking a state of the wireless charging;
when the state of the wireless charging corresponds to a certain condition, determining whether the electronic device is used by a user by using at least one sensor; and
providing a notification based on whether the electronic device is used by the user.

17. The method of claim 16, wherein providing the notification based on whether the electronic device is used by the user comprises when it is determined that the electronic device is used by the user, not providing the notification; and when it is determined that the electronic device is not used by the user, providing the notification.

18. The method of claim 16, further comprising:
when the wireless charging starts, blocking a vibration function of the electronic device; and
determining a provision type of the notification,
wherein the notification is provided in the determined provision type.

19. The method of claim 16, wherein providing the notification comprises:
determining whether a predetermined notification limitation condition is satisfied; and
when the notification limitation condition is satisfied, not providing the notification and when the notification limitation condition is not satisfied, providing the notification.

20. A non-transitory computer-readable storage medium for storing a computer readable instruction, wherein the instruction, when executed by a processor of an electronic device, allows the electronic device to perform:
wirelessly charging the electronic device by using power received from an external device;
checking a state of the wireless charging;
when the state of the wireless charging corresponds to a certain condition, determining whether the electronic device is used by a user by using at least one sensor; and
providing a notification based on whether the electronic device is used by the user.

* * * * *